United States Patent
Capobianco et al.

(10) Patent No.: US 7,065,350 B2
(45) Date of Patent: Jun. 20, 2006

(54) APPARATUS AND METHOD FOR COMMUNICATING A WIRELESS DATA SIGNAL IN A BUILDING

(75) Inventors: Anthony Capobianco, Cape Coral, FL (US); John Timothy Nolan, Cape Coral, FL (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 534 days.

(21) Appl. No.: 10/402,394

(22) Filed: Mar. 28, 2003

(65) Prior Publication Data

US 2004/0192285 A1   Sep. 30, 2004

(51) Int. Cl.
*H04Q 7/20* (2006.01)
*H04B 7/15* (2006.01)

(52) U.S. Cl. .................. 455/422.1; 455/11.1
(58) Field of Classification Search ............. 455/422.1, 455/11.1, 7, 14, 16, 63.1, 562.1; 370/315; 375/211
See application file for complete search history.

(56) References Cited

U.S. PATENT DOCUMENTS

| | | | |
|---|---|---|---|
| 6,684,055 B1* | 1/2004 | Blackaby et al. | 455/11.1 |
| 6,895,218 B1* | 5/2005 | Yarkosky | 455/20 |
| 2002/0177401 A1* | 11/2002 | Judd et al. | 455/11.1 |
| 2004/0110469 A1* | 6/2004 | Judd et al. | 455/15 |
| 2004/0174900 A1* | 9/2004 | Volpi et al. | 370/466 |
| 2004/0224637 A1* | 11/2004 | Silva et al. | 455/63.4 |
| 2005/0073968 A1* | 4/2005 | Perlman | 370/315 |

\* cited by examiner

*Primary Examiner*—Benny Quoc Tieu
(74) *Attorney, Agent, or Firm*—Mayer & Williams PC; Heather Mansfield, Esq.; Karin L. Williams, Esq.

(57) ABSTRACT

The apparatus includes a first passive signal repeater and a second passive signal repeater, operable to respond to the wireless data signal and to first and second wireless transceivers, respectively. A mounting device is configured to traverse a structure within the building, and to receive the first and second passive signal repeaters. The mounting device has a transfer path, which is operable to transfer the wireless data received at the first passive signal repeater to the second passive signal repeater, and to transfer the wireless data signal at the second passive signal repeater to the first passive signal repeater. When the mounting device traverses the structure, and the first and second signal repeaters are arranged on the mounting device in such a manner that the transfer path is operating, a wireless signal path traversing the structure is created between the first wireless transceiver and the second wireless transceiver.

19 Claims, 3 Drawing Sheets

APPARATUS AND METHOD FOR COMMUNICATING A WIRELESS DATA SIGNAL IN A BUILDING

FIELD OF THE INVENTION

Aspects of this invention relate generally to in-building wireless signal communication, and, more particularly, to an apparatus and method for communicating, in a building, a wireless data signal between wireless transceivers, and to a method for arranging such an apparatus in a building.

BACKGROUND OF THE INVENTION

Home and small-office in-building computer networks, which allow the sharing of a single network connection among computers in multiple rooms, have gained popularity in recent years, with the advent of wireless computer networking technology. Wi-Fi refers to wireless computer networking technology used to link computers for tasks such as sharing high-speed Internet connections, in accordance with the 802.11 series of specifications promulgated by the Institute of Electrical and Electronics Engineers, Inc. (IEEE) (referred to as "IEEE 802.11x Specifications"). In a typical Wi-Fi network, a high-speed Internet connection from a device, such as a cable modem or digital subscriber line, is connected to a wireless access point, which broadcasts and receives a wireless data signal to and from wireless transceivers located in other areas of the building.

One problem encountered by wireless home networks in general, and Wi-Fi networks in particular, is obstruction of, and interference with, the wireless data signal—physical structures, such as concrete block walls, or metal-covered wall insulation, and electromagnetic devices, such as cordless phones, microwave ovens and baby monitors, can cause the wireless data signal to fade. Because IEEE 802.11x Specifications require communication bit rates to decrease in response to reduced signal conditions, wireless connections frequently become slow or intermittent.

Several methods have been adopted for improving wireless connections in Wi-Fi networks. One simple, but often impractical, technique involves moving the wireless access point to an open area, away from physical structures or other wireless devices, with an unobstructed view through a door or window to other networked devices.

Another technique involves increasing the strength of the wireless data signal at the wireless access point, using commercially available signal boosters. Signal boosters, however, often only have partial or limited success in improving wireless connections, depending on the location of the wireless access point, and the location and type of signal obstruction or interference, and may cause interference with other electromagnetic devices.

Powerline networking uses a building's electrical wiring to distribute a high-speed Internet connection around the building. Special adapters connected to laptop or desktop computers may be plugged into electrical outlets, and the electrical wiring can be used, in conjunction with a wireless network, to fill in coverage gaps where wireless signals are weak. A Powerline network, however, does not allow as much mobility as a fully wireless network.

In other wireless applications, such as cellular communications, service coverage has been extended in difficult-to-reach areas, such as tunnels or large buildings, by installing radiating cables, often referred to as leaky coax cables, coupled with passive antennas, in such areas. Installation of leaky coax cables in homes or small businesses, however, is often prohibitively complicated and expensive—minimally requiring antenna mountings, radiating cables and cable support hangers, along with the technical expertise to design, install and optimize the leaky coax cable system.

There is, therefore, a need for a simple, low-cost device and method for communicating, in a building, a wireless data signal between wireless transceivers, which effectively extends the range of the wireless data signal in the presence of physical or electromagnetic obstacles or interference, and which allows users to take advantage of the full mobility of a wireless network. There is also a need for a method for arranging such an apparatus, which does not require extensive design or technical expertise.

SUMMARY OF THE INVENTION

According to an aspect of the present invention, the foregoing needs are addressed by an apparatus for communicating, in a building, a wireless data signal between a first wireless transceiver and a second wireless transceiver, which includes a first passive signal repeater, operable to respond to the wireless data signal and to the first wireless transceiver; a second passive signal repeater, operable to respond to the wireless data signal and to the second wireless transceiver; and a mounting device configured to traverse a structure within the building, and to receive the first and second passive signal repeaters. The mounting device has a transfer path, which is operable to transfer the wireless data signal received from the first wireless transceiver at the first passive signal repeater to the second passive signal repeater, and to transfer the wireless data signal received from the second wireless transceiver at the second passive signal repeater to the first passive signal repeater. When the mounting device traverses the structure, and the first and second passive signal repeaters are arranged on the mounting device in such a manner that the transfer path is operating, a wireless signal path traversing the structure is created for the wireless data signal between the first wireless transceiver and the second wireless transceiver.

According to another aspect of the present invention, a method for arranging, in a building, an apparatus for communicating a wireless data signal between a first wireless transceiver and a second wireless transceiver, is provided. The method includes the step of: providing a first passive signal repeater, operable to respond to the wireless data signal and to the first wireless transceiver; providing a second passive signal repeater, operable to respond to the wireless data signal and to the second wireless transceiver; installing a mounting device having a transfer path to traverse a structure within the building; and disposing the first and second passive signal repeaters on the mounting device in such a manner that the transfer path is operable to transfer the wireless data signal received from the first wireless transceiver at the first passive signal repeater to the second passive signal repeater, and to transfer the wireless data signal received from the second wireless transceiver at the second passive signal repeater to the first passive signal repeater. When the transfer path is operating, a wireless signal path traversing the structure is created for the wireless data signal between the first wireless transceiver and the second wireless transceiver.

According to a further aspect of the present invention, a method for communicating, in a building, a wireless data signal between a first wireless transceiver and a second wireless transceiver, includes the steps of: providing a mounting device traversing a structure within the building, the mounting device having a transfer path; receiving the wireless data signal at a first passive signal repeater disposed on the mounting device, the first passive signal repeater responsive to the first wireless transceiver; and transferring, via the transfer path, the wireless data signal from the first passive signal repeater to a second passive signal repeater disposed on the mounting device, the second passive signal repeater responsive to the second wireless transceiver. A signal path traversing the structure is created for the wireless data signal between the first wireless transceiver and the second wireless transceiver.

DETAILED DESCRIPTION OF THE INVENTION

Figure 1:
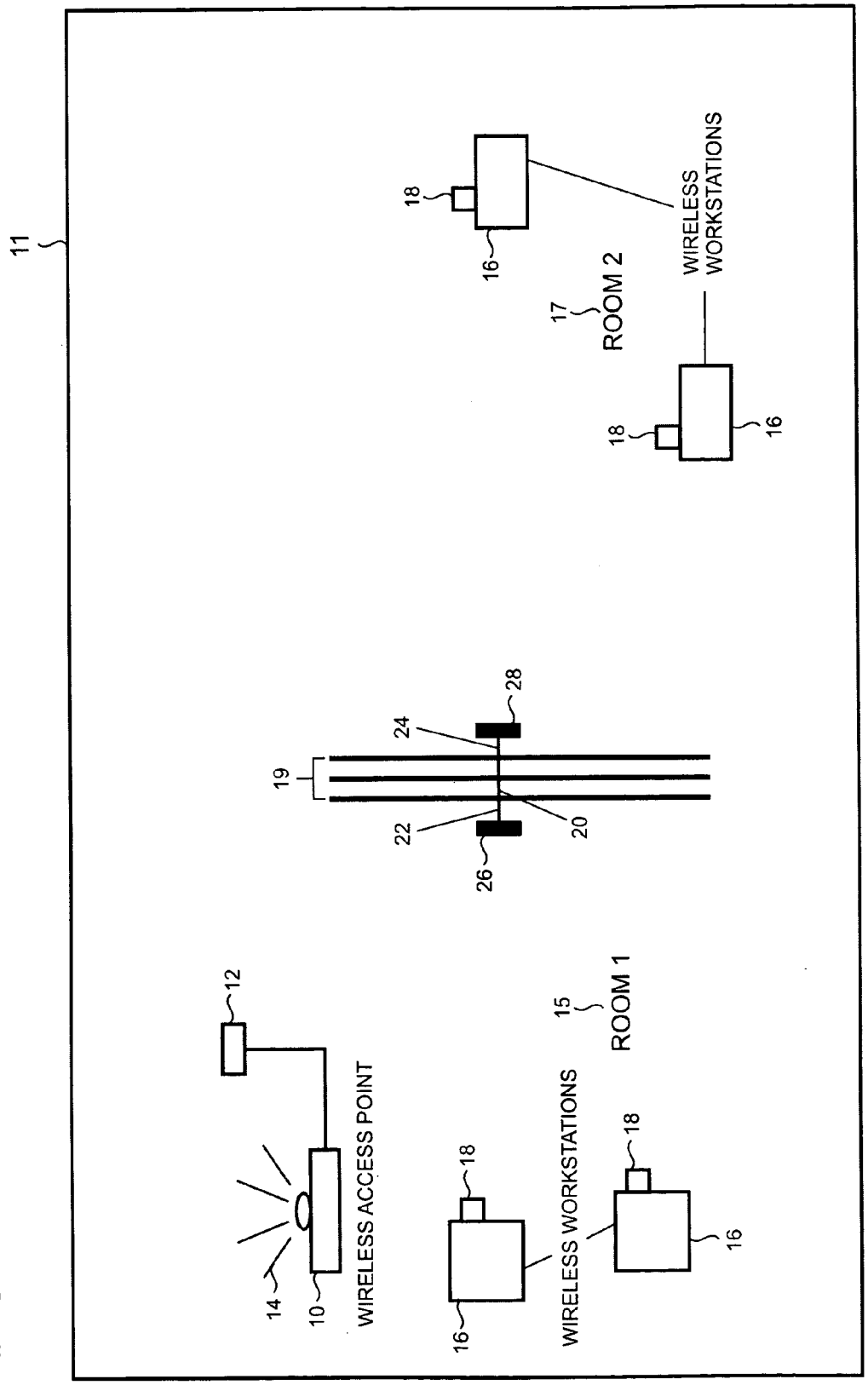
FIG. 1 is a diagram showing an apparatus for communicating a wireless data signal between wireless transceivers, and an installation arrangement therefore, in accordance with aspects of the present invention.

Turning now to the drawings, wherein like numerals designate like components, FIG. 1 is a diagram showing an apparatus for communicating a wireless data signal between wireless transceivers in a building, and an installation arrangement therefore, in accordance with aspects of the present invention. A building 11 houses a wireless transceiver 10, which is preferably a wireless access point commercially available from a variety of sources. Wireless access point 10 receives a network connection 12, which is preferably a high-speed Internet connection, from a cable modem, a digital subscriber line, or another source of a network connection, such as a hub or router. Wireless access point 10 broadcasts and receives a wireless data signal 14, which is preferably a signal transmitted and received in accordance with the 802.11 series of specifications promulgated by the Institute of Electrical and Electronics Engineers, Inc. (referred to as "IEEE 802.11x Specifications"), but may be any type of wireless signal responsive to network connection 12.

Wireless transceivers 18, located in areas of building 11 remote from wireless access point 10, such as other areas of room 1 15 or room 2 17, are adapted, by well-known methods, to communicate with wireless access point 10 via wireless data signal 14, in accordance with communication protocols compatible with network connection 12. As shown, wireless transceivers 18 are associated with wireless workstations 16, which may be devices such as laptop or desktop computers, or other devices, equipment or appliances responsive to wireless transceivers 18, internally or externally, and communicate with wireless access point 10 via IEEE 802.11x Specifications.

Building 11 includes multiple structures (not shown in detail), such as ceilings, floors, walls, furniture, portable phones, and other permanent or removable fixtures and physical items. Some, but not all, structures within building 11 may be sources of physical or electromagnetic obstruction and/or interference for the propagation of wireless data signal 14 between wireless access point 10 and wireless transceivers 18. For purposes of illustration, structure 19, which is a wall constructed, among other things, of foil-covered insulation and layers of sheet rock, is shown separating room 1 15 and room 2 17, and obstructing and/or interfering with propagation of wireless data signal 14 between wireless access point 10 in room 1 15 and wireless transceivers 18 in room 2 17.

In accordance with an aspect of the present invention, a mounting device 20, which is preferably an inflexible, metal or hard plastic shaft, but which may be another type of metal or plastic device having one or more segments, traverses a structure within building 11. As shown, mounting device 20 traverses the interior of wall 19, with one end 22 of mounting device 20 disposed on one side of wall 19, extending into room 1 15, and another end 24 of mounting device 20 disposed on the other side of wall 19, extending into room 2 17.

Mounting device 20 is designed to receive passive signal repeaters, or antennae, 26 and 28. Passive signal repeaters 26 and 28 are preferably parabolic, or dish, antennae, which are not highly frequency-dependent, but may also be other types of antennae, such as Yagi or dipole antennae. Passive signal repeaters 26 and 28 may be constructed of any suitable material, such as aluminum or another metal or material.

Passive signal repeater 26 is disposed on end 22 of mounting device 20, and passive signal repeater 28 is disposed on end 24 of mounting device 20, via N-type connectors (male-to-female) (not shown) located on the ends of mounting device 20. Feeds (not shown) associated with passive signal repeaters 26 and 28 are preferably substantially matched, and placed at the focal points of repeaters 26 and 28. Determining the type and location of a feed for a particular passive repeater may be readily accomplished by those skilled in the art—for example, for a given passive repeater having diameter "D" and a desired depth from rim-to-center "c," the focal point "f" may be calculated using the equation D2/16c. The ratio f/D is determined, and the feeds may be placed at the focal points of the passive repeaters. In practice, sizes of passive repeaters 26 and 28 may vary, depending on desired applications and frequencies to be reflected. In one example, passive repeaters 26, 28 reflect frequencies from about 2.4 GHz to about 5 GHz, and have diameters of 177.8 millimeters, and focal lengths of 88.9 millimeters. Signal gain at approximately 2.4 GHz would be about 10 dBi, and at 5 GHz would be approximately 16.4 dBi.

When installed on mounting device 20 as shown in FIG. 1, passive signal repeater 26 is responsive to wireless data signal 14 in room 1 15 from sources such as wireless access point 10 and transceivers 18, and passive signal repeater 28 is responsive to wireless data signal 14 in room 2 17 from sources such as transceivers 18 in room 2 17. Signal repeaters 26 and 28 may be manually oriented to maximize the reception and transmission of data signal 14 between repeaters 26 and 28 and transceivers 10, 18 in the vicinity of repeaters 26 and 28.

Mounting device 20 is preferably constructed with a center (not shown), such as a coaxial cable, which is responsive to the feeds associated with passive signal repeaters 26 and 28 and which, during normal operation in the illustrated configuration(s), creates a wireless signal path for wireless data signal 14 that traverses wall 19, operating to transfer wireless data signal 14 received at signal repeater 26 from the wireless access point 10 to signal repeater 28, and to transfer wireless data signal 14 received at signal repeater 28 from wireless transceivers 18 located in room 2 17 to signal repeater 26. The center of mounting device 20 is preferably impedance-matched to passive signal repeaters 26 and 28, and preferably has low insertion loss, along with other well-known desirable characteristics.

Mounting device 20 may be installed through wall 19 in a variety of ways. One technique, suitable for installation through sheet rock, includes passing one end of mounting device 20 through wall 19, by pushing mounting device 20 through a hole (not shown) in wall 19. The hole in wall 19 may be created prior to pushing mounting device 20 therethrough, or mounting device 20 may be pushed through intact wall 19. If mounting device 20 is pushed through intact wall 19, it is desirable to include a pointed end 22, 24 on mounting device 20, such as a metal or plastic pointed screw cover. One end of device 20 may have a screw attached thereto. The pointed screw cover may be unscrewed after mounting device 20 in installed through wall 19, and passive repeater 26 or 28 attached thereto. A spacer shim screw nut may then be tightened to ensure a solid connection of device 20 to wall 19. Alternatively, mounting device 20 may traverse the exterior of wall 19, being installed along a perimeter or edge of wall 19 using any suitable fastening means, or the entire repeater-device assembly may be mounted between wall studs and covered with paintable cloth fabric, for more complete concealment and aesthetic appeal.

Figure 2:
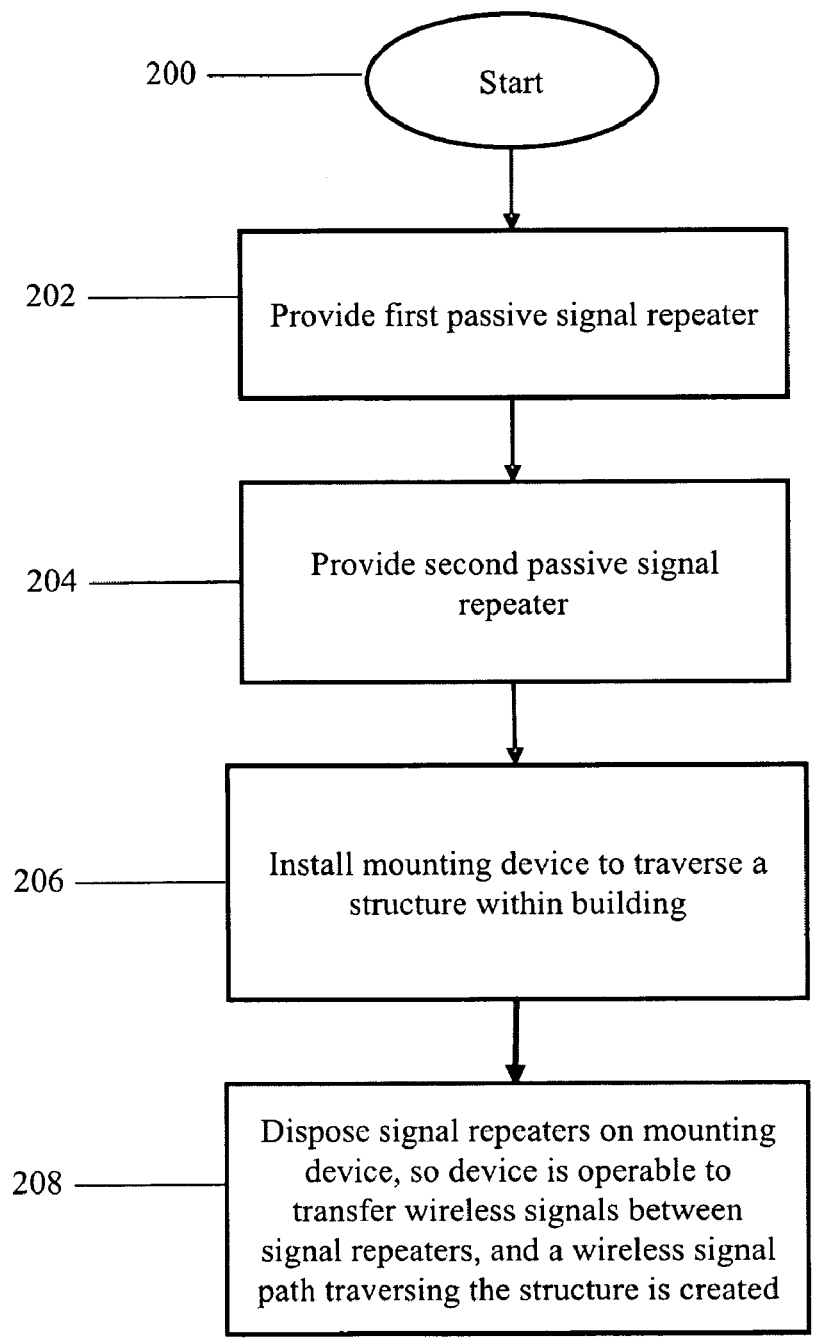
FIG. 2 is a flowchart of a method for arranging a device for communicating a wireless data signal between wireless transceivers, according to an aspect of the present invention.

FIG. 2 illustrates a method for arranging a device for communicating a wireless data signal in a building between transceivers in accordance with an aspect of the present invention. For purposes of illustration, it is assumed that wireless data signal 14 is communicated in building 11 between transceiver 10 in room 1 15 and transceivers 18 in room 2 17. The method starts at block 200, and continues to first step 202, of providing a first passive signal repeater, such as passive signal repeater 26, operable to respond to wireless data signal 14 and to wireless access point 10, and to second step 204, of providing a second passive signal repeater, such as passive signal repeater 28, operable to respond to wireless data signal 14 and to wireless transceivers 18 in room 2 17. Next, at step 206, a mounting device 20 having a transfer path, such as a metal shaft, is installed to traverse a structure, such as wall 19, in building 11. Finally, at step 208, signal repeaters 26 and 28 are disposed on the mounting device in such a manner that when the transfer path is operating, wireless data signal 14 is transferred from signal repeater 26 to signal repeater 28, and from signal repeater 28 to signal repeater 26, creating a wireless signal path for wireless data signal 14 that traverses wall 19.

Figure 3:
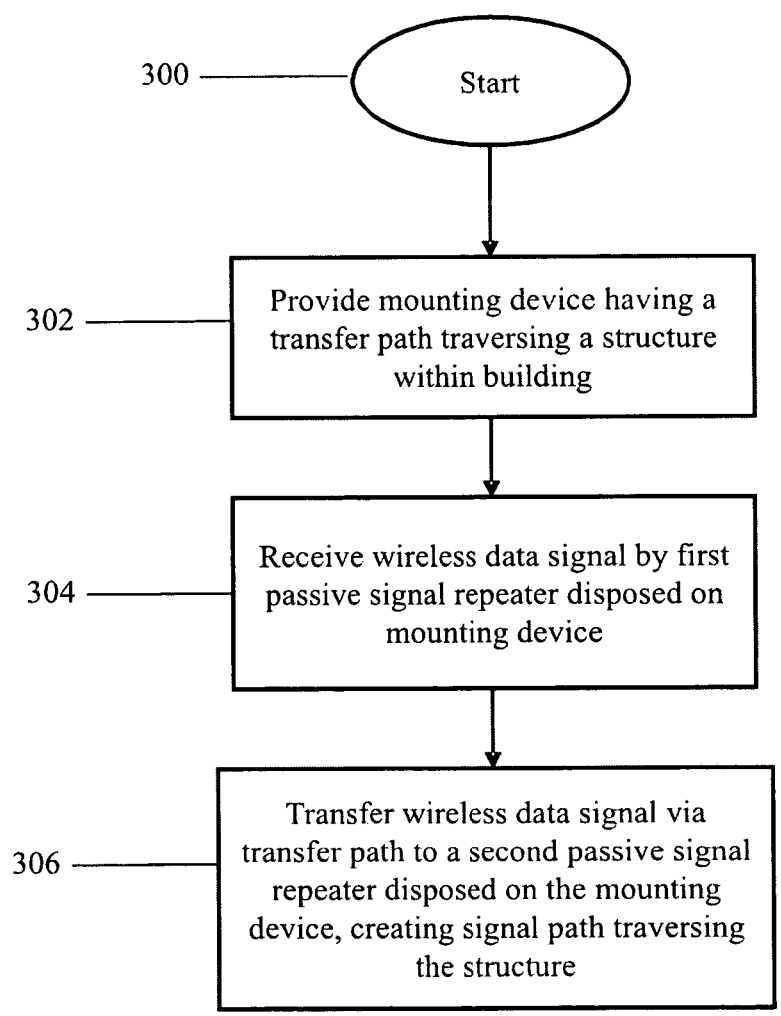
FIG. 3 is a flowchart of a method for communicating a wireless data signal between wireless transceivers, according to another aspect of the present invention.

FIG. 3 illustrates a method for communicating a wireless data signal in a building between transceivers, in accordance with another aspect of the present invention. For purposes of illustration, it is assumed that wireless data signal 14 is communicated in building 11 between wireless access point 10 in room 1 15 and transceivers 18 in room 2 17. The method starts at block 300, and continues at step 302, where a mounting device 20, such as a metal shaft having a transfer path, is provided traversing a structure, such as wall 19, in building 11. Next, at step 304, wireless data signal 14 is received from wireless access point 10 by a first passive signal repeater, such as passive signal repeater 26, disposed on mounting device 20. Wireless data signal 14 is then transferred via the transfer path to a second passive signal repeater, such as passive signal repeater 28, disposed on mounting device 20, as indicated at step 306, and a signal path traversing the structure is created for wireless data signal 14 between wireless access point 10 and one or more transceivers 18 in room 2 17.

It is, therefore, seen that the apparatuses and methods described herein address the obstruction of, and interference with, wireless data signals encountered by wireless home and office networks using simple and inexpensive hardware, which may be positioned without extensive technical expertise using existing structures within a building to circumvent both physical and electromagnetic sources of signal obstruction and/or interference, and which does not interfere with the mobility of transceivers afforded by a wireless network. Passively reflected wireless data signals supplement existing signals, and generally improve signal strength in the building environment.

Although IEEE 802.11x Specifications have been specifically referred to herein, aspects of the present invention are applicable to communication protocols described by different specifications and/or frequency ranges, and responsive to networks other than the Internet. For example, Bluetooth specifications, infrared technology, portable communication devices such as phones, pagers, personal digital assistants, or combinations thereof, and associated communication protocols and frequencies may be used in conjunction with aspects of the present invention. In addition, other in-building structures may be substituted for wall 19 to realize aspects of the present invention. It will further be understood that when one element is indicated as being responsive to another element, the elements may communicate directly or indirectly, via any desired medium or media.

It will also be apparent that other and further forms of the invention, and embodiments other than the specific embodiments described above, may be devised without departing from the spirit and scope of the appended claims and their equivalents, and therefore it is intended that the scope of this invention will only be governed by the following claims and their equivalents.

The invention claimed is:

1. Apparatus for communicating, in a building, a wireless data signal between a first wireless transceiver and a second wireless transceiver, comprising:
   a first passive signal repeater, operable to respond to the wireless data signal and to the first wireless transceiver;
   a second passive signal repeater, operable to respond to the wireless data signal and to the second wireless transceiver; and
   a mounting device configured to traverse a structure within the building, and to receive the first and second passive signal repeaters, the mounting device having a transfer path, the transfer path operable to transfer the wireless data signal received from the first wireless transceiver at the first passive signal repeater to the second passive signal repeater, and to transfer the wireless data signal received from the second wireless transceiver at the second passive signal repeater to the first passive signal repeater,
   wherein when the mounting device traverses the structure, and the first and second passive signal repeaters are arranged on the mounting device in such a manner that the transfer path is operating, a wireless signal path traversing the structure is created for the wireless data signal between the first wireless transceiver and the second wireless transceiver.

2. The apparatus according to claim 1, wherein a frequency range of the wireless data signal is one of a frequency range supported by Institute of Electrical and Electronics Engineers, Inc.'s 802.11 series of specifications, a frequency range supported by Bluetooth series of specifications, and an infrared frequency range.

3. The apparatus according to claim 2, wherein the first wireless transceiver is associated with a network connection device and the second wireless transceiver is associated with a computer device.

4. The apparatus according to claim 3, wherein the network comprises the Internet.

5. The apparatus according to claim 2, wherein the mounting device comprises a metal shaft.

6. The apparatus according to claim 5, wherein the shaft has a first end and a second end, the first end configured to be disposed on one side of the structure and to receive the first signal repeater, and the second end configured to be disposed on another side of the structure and to receive the second signal repeater.

7. The apparatus according to claim 6, wherein the structure comprises a wall.

8. The apparatus according to claim 6, wherein the shaft is configured to be pushed through the wall.

9. The apparatus according to claim 6, wherein the wireless signal path mitigates an effect of an interference source in the building.

10. The apparatus according to claim 9, wherein the interference source comprises one of an electromagnetic source and a physical source.

11. The apparatus according to claim 10, wherein the interference source comprises the structure.

12. A method for arranging, in a building, an apparatus for communicating a wireless data signal between a first wireless transceiver and a second wireless transceiver, comprising:
    providing a first passive signal repeater, operable to respond to the wireless data signal and to the first wireless transceiver;
    providing a second passive signal repeater, operable to respond to the wireless data signal and to the second wireless transceiver;
    installing a mounting device having a transfer path to traverse a structure within the building; and
    disposing the first and second passive signal repeaters on the mounting device in such a manner that the transfer path is operable to transfer the wireless data signal received from the first wireless transceiver at the first passive signal repeater to the second passive signal repeater, and to transfer the wireless data signal received from the second wireless transceiver at the second passive signal repeater to the first passive signal repeater,
    wherein when the transfer path is operating, a wireless signal path traversing the structure is created for the wireless data signal between the first wireless transceiver and the second wireless transceiver.

13. The method according to claim 12, wherein a frequency range of the wireless data signal is one of a frequency range supported by Institute of Electrical and Electronics Engineers, Inc.'s 802.11 series of specifications, a frequency range supported by Bluetooth series of specifications, and an infrared frequency range.

14. The method according to claim 13, wherein the first wireless transceiver is associated with a network connection device and the second wireless transceiver is associated with a computer device.

15. The method according to claim 14, wherein the network comprises the Internet.

16. A method for communicating, in a building, a wireless data signal between a first wireless transceiver and a second wireless transceiver, comprising:
    providing a mounting device traversing a structure within the building, the mounting device having a transfer path;
    receiving the wireless data signal at a first passive signal repeater disposed on the mounting device, the first passive signal repeater responsive to the first wireless transceiver; and
    transferring, via the transfer path, the wireless data signal from the first passive signal repeater to a second passive signal repeater disposed on the mounting device, the second passive signal repeater responsive to the second wireless transceiver,
    wherein a signal path traversing the structure is created for the wireless data signal between the first wireless transceiver and the second wireless transceiver.

17. The method according to claim 16, wherein a frequency range of the wireless data signal is one of a frequency range supported by Institute of Electrical and Electronics Engineers, Inc.'s 802.11 series of specifications, a frequency range supported by Bluetooth series of specifications, and an infrared frequency range.

18. The method according to claim 16, wherein the first wireless transceiver is associated with a network connection device and the second wireless transceiver is associated with a computer device.

19. The method according to claim 17, wherein the network comprises the Internet.

* * * * *